United States Patent

Marugame

(10) Patent No.: US 12,541,846 B2
(45) Date of Patent: Feb. 3, 2026

(54) IMAGE PROCESSING DEVICE FOR PREPARING LESION CANDIDATE IMAGES FOR A MACHINE LEARNING MODEL

(71) Applicant: NEC Corporation, Tokyo (JP)

(72) Inventor: Atsushi Marugame, Tokyo (JP)

(73) Assignee: NEC CORPORATION, Tokyo (JP)

( * ) Notice: Subject to any disclaimer, the term of this patent is extended or adjusted under 35 U.S.C. 154(b) by 289 days.

(21) Appl. No.: 18/288,879

(22) PCT Filed: Feb. 28, 2023

(86) PCT No.: PCT/JP2023/007208
§ 371 (c)(1),
(2) Date: Oct. 30, 2023

(87) PCT Pub. No.: WO2024/180644
PCT Pub. Date: Sep. 6, 2024

(65) Prior Publication Data
US 2025/0078256 A1    Mar. 6, 2025

(51) Int. Cl.
*G06T 7/00* (2017.01)
*G06T 3/4053* (2024.01)
*G06T 11/00* (2006.01)
*G06T 11/60* (2006.01)

(52) U.S. Cl.
CPC .......... *G06T 7/0012* (2013.01); *G06T 3/4053* (2013.01); *G06T 11/001* (2013.01); *G06T 11/60* (2013.01); *G06T 2207/30096* (2013.01)

(58) Field of Classification Search
CPC .................................................. G06T 3/4053
See application file for complete search history.

(56) References Cited

U.S. PATENT DOCUMENTS

| | | | |
|---|---|---|---|
| 2019/0380617 A1 | 12/2019 | Oosake et al. | |
| 2020/0074623 A1* | 3/2020 | Matsumoto | G06N 3/088 |
| 2020/0084380 A1 | 3/2020 | Kuriyama | |
| 2021/0244260 A1 | 8/2021 | Uyama et al. | |
| 2023/0214977 A1* | 7/2023 | Okumura | A61B 6/5217 382/131 |
| 2023/0237671 A1* | 7/2023 | Khinvasara | G06T 7/20 382/104 |
| 2024/0070810 A1* | 2/2024 | Oosake | G16H 30/40 |

FOREIGN PATENT DOCUMENTS

| | | |
|---|---|---|
| JP | 6352673 B2 | 7/2018 |
| JP | 2020-036773 A | 3/2020 |
| WO | 2018/159461 A1 | 9/2018 |
| WO | 2018/211709 A1 | 11/2018 |
| WO | 2020/054566 A1 | 3/2020 |

OTHER PUBLICATIONS

International Search Report for PCT Application No. PCT/JP2023/007208, mailed on Apr. 25, 2023.

* cited by examiner

Primary Examiner — Benjamin O Dulaney (57) ABSTRACT

In an image processing device, the image acquisition means acquires a lesion candidate image including a lesion candidate detected from an endoscopic image. The resize means performs resize processing for resizing a size of the lesion candidate image according to a target size while maintaining an aspect ratio of the lesion candidate image. The padding means performs padding processing for matching a size of a resized image obtained by the resize processing to the target size.

6 Claims, 7 Drawing Sheets

IMAGE PROCESSING DEVICE FOR PREPARING LESION CANDIDATE IMAGES FOR A MACHINE LEARNING MODEL

This application is a National Stage Entry of PCT/JP2023/007208 filed on Feb. 28, 2023, the contents of all of which are incorporated herein by reference, in their entirety.

TECHNICAL FIELD

The present disclosure relates to a technique of image processing applied to endoscopic images.

BACKGROUND ART

There has been conventionally proposed a technique for processing endoscopic images or a signal corresponding to the endoscopic images.

Specifically, for example, Patent Document 1 discloses a technique for generating image data for one frame by performing signal processing such as color interpolation, color separation, color balance adjustment, gamma correction, and image enhancement processing for an image signal of one frame inputted from an electronic endoscope. Further, Patent Document 1 discloses a technique of generating a display image data by applying image clipping processing, electronic enlargement processing, and mask processing to image data of one frame.

PRECEDING TECHNICAL REFERENCES

Patent Document

Patent Document 1: Japanese Patent No. 6352673

SUMMARY

Problem to be Solved

However, according to the technique disclosed in Patent Document 1, for example, when the processing to change the state of the element representing the characteristic of the lesion, such as two-dimensional shape and surface pattern, from the original state (state of the original image) is performed, the diagnostic accuracy of the lesion may be reduced.

That is, according to the technique disclosed in Patent Document 1, there is a problem that the diagnostic accuracy of the lesion candidates included in the endoscopic image may be lowered.

One object of the present disclosure is to provide an image processing device capable of improving the diagnostic accuracy of a lesion candidate included in an endoscopic image.

Means for Solving the Problem

According to an example aspect of the present invention, there is provided an image processing device comprising:
  an image acquisition means configured to acquire a lesion candidate image including a lesion candidate detected from an endoscopic image;
  a resize means configured to perform resize processing for resizing a size of the lesion candidate image according to a target size while maintaining an aspect ratio of the lesion candidate image; and
  a padding means configured to perform padding processing for matching a size of a resized image obtained by the resize processing to the target size.

According to another example aspect of the present invention, there is provided an image processing method comprising:
  acquiring a lesion candidate image including a lesion candidate detected from an endoscopic image;
  performing resize processing for resizing a size of the lesion candidate image according to a target size while maintaining an aspect ratio of the lesion candidate image; and
  performing padding processing for matching a size of a resized image obtained by the resize processing to the target size.

According to still another example aspect of the present invention, there is provided a recording medium storing a program, the program causing a computer to execute:
  acquiring a lesion candidate image including a lesion candidate detected from an endoscopic image;
  performing resize processing for resizing a size of the lesion candidate image according to a target size while maintaining an aspect ratio of the lesion candidate image; and
  performing padding processing for matching a size of a resized image obtained by the resize processing to the target size.

Effect

According to the present disclosure, it is possible to improve the diagnostic accuracy of the lesion candidate included in the endoscopic image.

EXAMPLE EMBODIMENTS

Preferred example embodiments of the present invention will be described with reference to the accompanying drawings.

First Example Embodiment

[Hardware Configuration]

Figure 1:
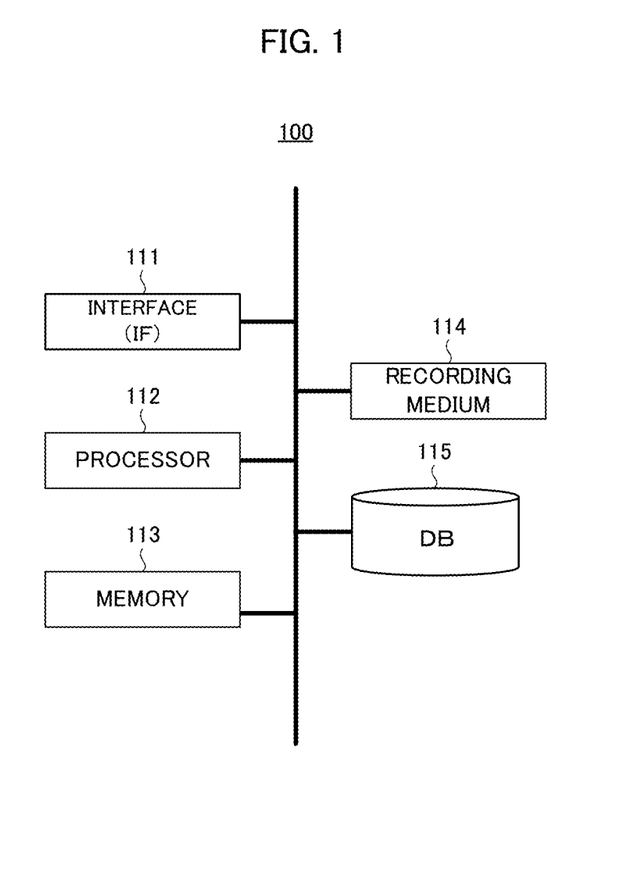
FIG. 1 is a block diagram showing a hardware configuration of an image processing device according to a first example embodiment.

FIG. 1 is a block diagram illustrating a hardware configuration of an image processing device according to a first example embodiment. As illustrated in FIG. 1, the image processing device 100 includes an interface (IF) 111, a processor 112, a memory 113, a recording medium 114, and a DB 115.

The IF 111 inputs and outputs data to and from external devices. For example, an endoscopic image obtained by imaging a subject in a body cavity with an endoscope is inputted to the image processing device 100 through the IF 111. Note that, in this example embodiment, unless otherwise mentioned, a description will be given on the assumption that an endoscopic image having color components of R (red), G (green), and B (blue) is inputted to the image processing device 100.

The processor 112 is a computer such as a CPU (Central Processing Unit) and controls the entire image processing device 100 by executing a program prepared in advance. Specifically, the processor 112 performs, for example, the processing related to the detection of a lesion candidate such as a tumor included in the endoscopic image, and the processing related to the acquisition of the lesion candidate image including the lesion candidate.

The memory 113 may include a ROM (Read Only Memory), a RAM (Random Access Memory), and the like. The memory 113 is also used as a working memory during various processing by the processor 112.

The recording medium 114 is a non-volatile and non-transitory recording medium such as a disk-like recording medium or a semiconductor memory and is configured to be detachable from the image processing device 100. The recording medium 114 records various programs executed by the processor 112. When the image processing device 100 executes various kinds of processing, the program recorded on the recording medium 114 is loaded into the memory 113 and executed by the processor 112.

The DB 115 stores, for example, endoscopic images inputted through the IF 111 and the processing results obtained by the processing of the processor 112.

[Functional Configuration]

Figure 2:
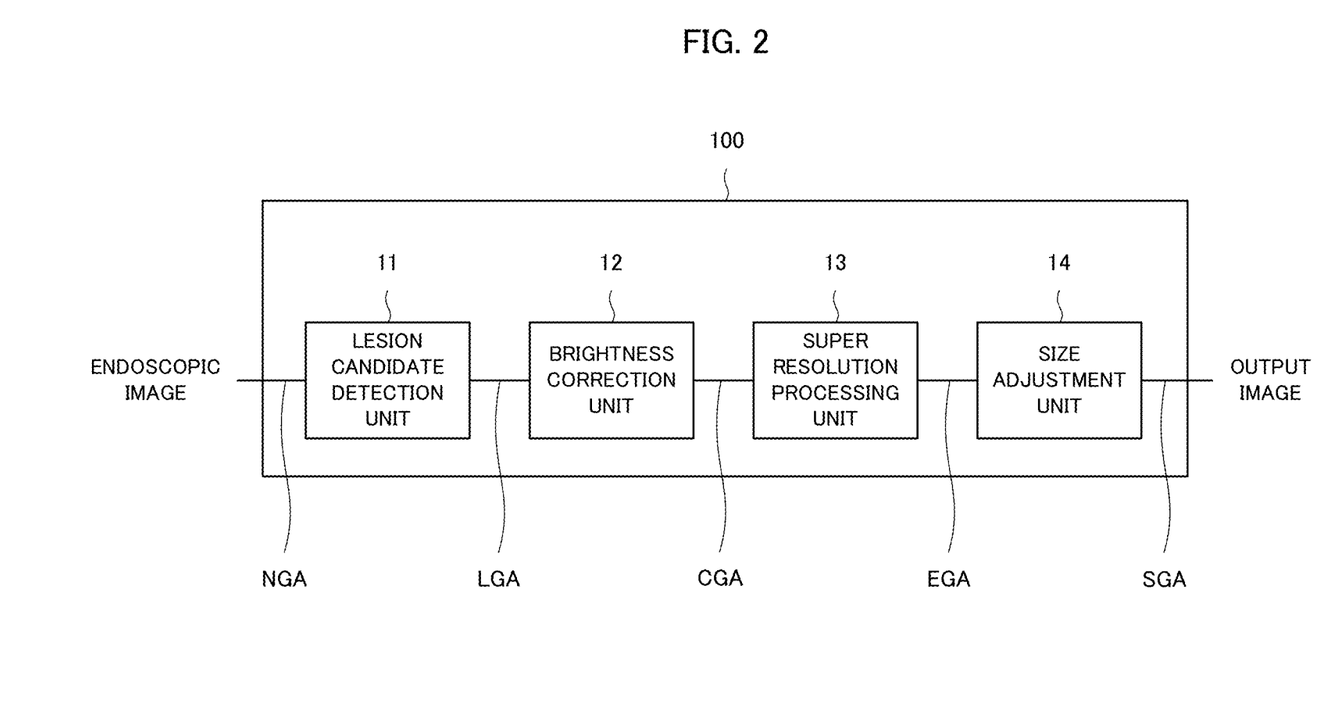
FIG. 2 is a block diagram showing a functional configuration of the image processing device according to the first example embodiment.

FIG. 2 is a block diagram illustrating a functional configuration of the image processing device according to the first example embodiment. As shown in FIG. 2, the image processing device 100 includes a lesion candidate detection unit 11, a brightness correction unit 12, a super resolution processing unit 13, and a size adjustment unit 14.

The lesion candidate detection unit 11 has a function as an image acquisition means. The lesion candidate detection unit 11 detects the lesion candidate such as a tumor included in the endoscopic image inputted to the image processing device 100. Detection of the lesion candidate may be performed by the image processing of an endoscopic image, or may be performed by a user who visually monitors the endoscopic image. Further, the lesion candidate detection unit 11 acquires the lesion candidate image including the lesion candidate detected from the endoscopic image and outputs the acquired lesion candidate image to the brightness correction unit 12.

Figure 3:
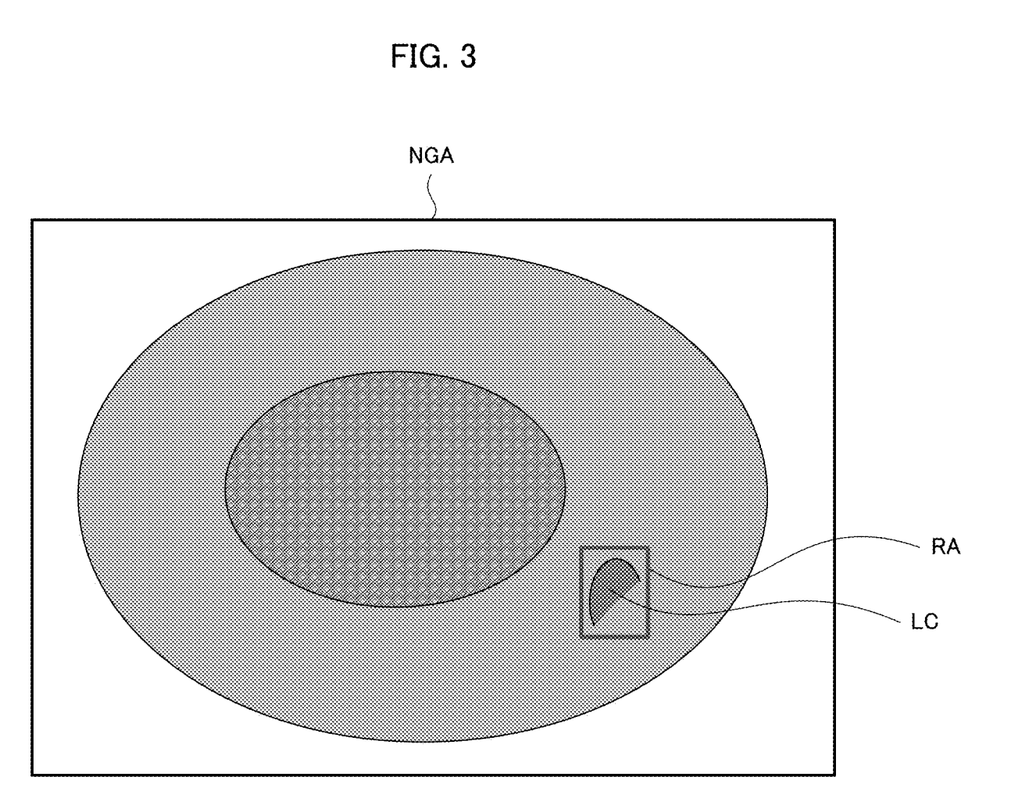
FIG. 3 shows an example of an endoscopic image to be processed by the image processing device according to the first example embodiment.

Specifically, when the endoscopic image NGA as shown in FIG. 3 is inputted to the image processing device 100, for example, the lesion candidate detection unit 11 detects the lesion candidate LC included in the endoscopic image NGA. Further, the lesion candidate detection unit 11 extracts a rectangular area RA including the lesion candidate LC detected from the endoscopic image NGA, and acquires an image corresponding to the rectangular area RA as the lesion candidate image LGA. Then, the lesion candidate detection unit 11 outputs the lesion candidate image LGA to the brightness correction unit 12. FIG. 3 is a diagram illustrating an example of an endoscopic image processed by the image processing device according to the first example embodiment.

The brightness correction unit 12 has a function as a brightness correction means. The brightness correction unit 12 generates a plurality of lesion candidate images having brightness different from each other on the basis of the brightness of the lesion candidate image outputted from the lesion candidate detection unit 11. In addition, the brightness correction unit 12 acquires the synthesized image by synthesizing the plurality of the generated lesion candidate images as described above and outputs the acquired synthesized image to the super resolution processing unit 13.

Here, a specific example of the function of the brightness correction unit 12 will be described.

The brightness correction unit 12 converts the R component value, the G component value, and the B component value of each pixel of the lesion candidate image LGA outputted from the lesion candidate detection unit 11 into the H (hue) component value, the S (saturation) component value, and the V (Value or brightness) component value. The brightness correction unit 12 acquires a plurality of V component values that differ from each other by performing an arithmetic processing of adding or subtracting a predetermined value (for example, 10) to or from the V component value obtained by the above-described conversion for each pixel of the lesion candidate image LGA. The brightness correction unit 12 generates a lesion candidate image HGA having the H component value and the S component value obtained by the above-described conversion and the V component value obtained by the above-described arithmetic process. Also, the brightness correction unit 12 generates a plurality of lesion candidate images HGA corresponding to each of the plurality of V component values obtained by the above-described arithmetic processing. Further, the brightness correction unit 12 acquires a synthesized image CGA by synthesizing the plurality of the lesion candidate images HGA using a method according to HDR (High Dynamic Range) synthesis, and outputs the acquired synthesized image CGA to the super resolution processing unit 13.

In this example embodiment, as a technique according to HDR synthesis, for example, it is possible to use a technique disclosed in Tom Mertens, et. al, "Exposure Fusion: A Simple and Practical Alternative to High Dynamic Range Photography," Computer Graphics Forum, vol. 28, no. 1, pp. 161-171, March 2009. In addition, in the present example embodiment, as a technique according to HDR synthesis, it is desirable to use a technique which can be implemented even in a condition in which there is no information relating to exposure of an endoscopic image NGA.

According to the present example embodiment, instead of the method described in the above specific example, the brightness correction unit 12 may acquire the synthesized image by the method described below and output the acquired synthesized image to the super resolution processing unit 13.

The brightness correction unit 12 detects the gamma characteristic (gamma curve) in the lesion candidate image LGA outputted from the lesion candidate detection unit 11. The brightness correction unit 12 acquires a plurality of gamma values different from each other, by performing arithmetic processing such as adding or subtracting a predetermined value to or from the gamma value in the gamma characteristic detected as described above. The brightness correction unit 12 generates the lesion candidate image HGB by applying the gamma value obtained by the above-described arithmetic processing to the gamma characteristic of the lesion candidate image LGA. The brightness correction unit 12 generates a plurality of lesion candidate images HGB corresponding to the plurality of gamma values obtained by the above-described arithmetic processing. Further, the brightness correction unit 12 acquires a synthesized image CGB by synthesizing the plurality of lesion candidate images HGB using the method according to HDR synthesis, and outputs the acquired synthesized image CGB to the super resolution processing unit 13.

As described above, the brightness correction unit 12 can correct the brightness of the lesion candidate image.

The super resolution processing unit 13 has a function as a super resolution processing means. The super resolution processing unit 13 performs super resolution processing to enlarge the size of the synthesized image outputted from the brightness correction unit 12 to a size larger than the size of the final output image outputted from the image processing device 100. In other words, the super resolution processing unit 13 performs super resolution processing to increase the resolution of the synthesized image outputted from the brightness correction unit 12 to a resolution higher than the resolution of the final output image outputted from the image processing device 100. The super resolution processing unit 13 outputs the enlarged image obtained by applying the aforementioned super resolution processing on the synthesized image to the size adjustment unit 14.

Specifically, for example, the super resolution processing unit 13 applies super resolution processing using Lanczos filters on the synthesized image CGA (or CGB) outputted from the brightness correction unit 12 to acquire the enlarged image EGA. Alternatively, for example, the super resolution processing unit 13 can obtain the enlarged image EGA by applying super resolution processing based on the technique disclosed in Bee Lim, et. al, "Enhanced Deep Residual Networks for Single Image Super-Resolution", 2nd NTIRE: New Trends in Image Restoration and Enhancement workshop and challenge on image super-resolution in conjunction with CVPR 2017, on the synthesized image CGA (or CGB) outputted from the brightness correction unit 12.

The super resolution processing unit 13 may set the magnification in the super resolution processing to an arbitrary magnification as long as the size of the synthesized image is enlarged to a size larger than that of the final output image. The size of the final output image is an example of a target size in the present example embodiment, and is desirably set to a size suitable for the application of the image.

As described above, the super resolution processing unit 13 can perform the super resolution processing of enlarging the size of the lesion candidate image after the brightness correction to the size larger than the target size.

The size adjustment unit 14 has a function as a resize means and a padding means. The size adjustment unit 14 performs resize processing of reducing the size of the enlarged image according to the size of the final output image while maintaining the aspect ratio of the enlarged image outputted from the super resolution processing unit 13. Also, the size adjustment unit 14 performs padding processing of matching the size of the resized image obtained by performing the aforementioned resize processing on the enlarged image with the size of the final output image. The size adjustment unit 14 outputs the image obtained by performing the above-described padding processing on the resized image to outside as the final output image.

Figure 4:
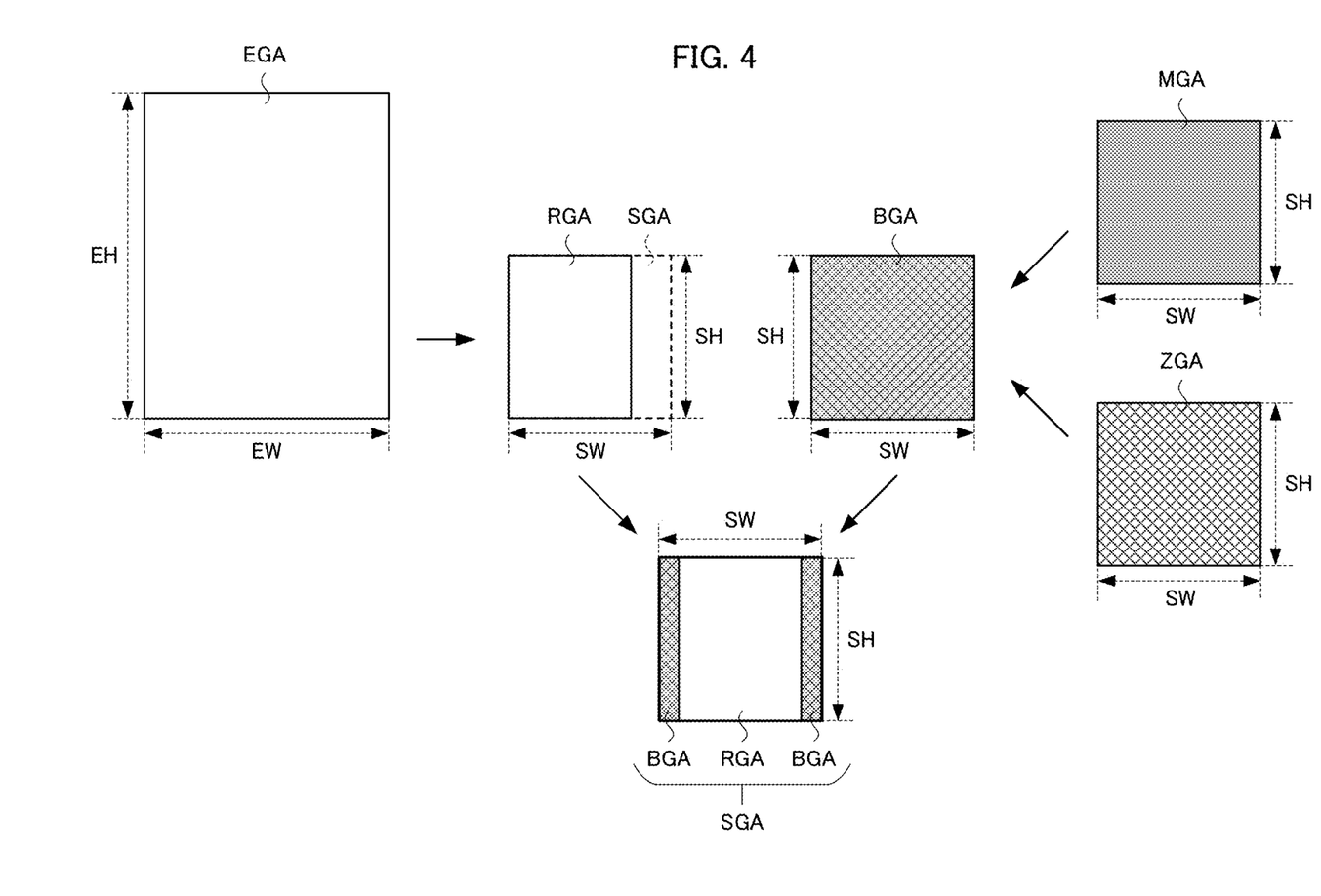
FIG. 4 is a diagram showing an outline of processing performed by the image processing device according to the first example embodiment.

Here, a specific example of the function of the size adjustment unit 14 will be described with reference to FIG. 4. In FIG. 4, for convenience of illustration, some elements such as the lesion candidate LC included in the enlarged image EGA are omitted. Further, in the description of the specific example below, the "length" may be read as "the number of pixels". FIG. 4 is a diagram illustrating an outline of processing performed by the image processing device according to the first example embodiment.

The size adjustment unit 14 acquires the vertical length SH and the horizontal length SW of the final output image SGA. Also, the size adjustment unit 14 acquires a length EX which is a relatively larger one of the vertical length EH and the horizontal length EW of the enlarged image EGA. Based on the length SH, the length SW and the length EX, the size adjustment unit 14 acquires the resized image RGA by reducing the size of the enlarged image EGA to the largest size that fits inside the final output image SGA while maintaining the aspect ratio of the enlarged image EGA (see FIG. 4). FIG. 4 shows an example in a case where EH=EX and SH=SW. Specifically, when the length SH is larger than the length SW, for example, the size adjustment unit 14 reduces the enlarged image EGA so that the length EX matches the length SH while maintaining the aspect ratio of the enlarged image EGA, thereby acquiring the resized image RGA. For example, when the length SW is larger than the length SH, the size adjustment unit 14 reduces the enlarged image EGA so that the length EX matches the length SW while maintaining the aspect ratio of the enlarged image EGA, thereby acquiring the resized image RGA. For example, when the length SW and the length SH are equal, the size adjustment unit 14 reduces the enlarged image EGA so that the length EX corresponds to the length SW or the length SH while maintaining the aspect ratio of the enlarged image EGA, thereby acquiring the resized image RGA.

According to the above-described processing, the size adjustment unit 14 can acquire the resized image RGA having the vertical length=400 and the horizontal length=300, for example, in the case where SW=SH=400, EH=800 and EW=600.

The size adjustment unit 14 acquires an R intermediate value MVR corresponding to the intermediate value of the R component values of the pixels included in the enlarged image EGA, a G intermediate value MVG corresponding to the intermediate value of the G component values of the pixels, and a B intermediate value MVB corresponding to the intermediate value of the B component values of the pixels. The size adjustment unit 14 generates a monochromatic image MGA having the same size (length SH and SW) as the size of the final output image SGA and corresponding to an image in which the entire area is colored in the color represented by the R intermediate value MVR, the G intermediate value MVG, and the B intermediate value MVB (see FIG. 4). Further, the size adjustment unit 14 acquires a background image BGA having the same size (length SH and SW) as the size of the final output image SGA by adding the noise image ZGA representing irregular noise within a predetermined amplitude to the monochrome image MGA generated as described above (see FIG. 4). The noise image ZGA has the same size (length SH and SW) as the final output image SGA. The predetermined amplitude is preferably set to an amplitude sufficiently smaller than the dynamic range of the color component values of the pixels in the enlarged image EGA, for example. Specifically, for example, when the color component values of the pixels in the enlarged image EGA belong to the range of 0 to 255, it is desirable that the predetermined amplitude is set to 20. Then, for example, when the above-described predetermined magnitude is set to 20 and the R intermediate value MVR of one pixel in the monochrome image MGA is 220, the R component value of one pixel in the background image BGA can be set to a value from 200 to 240.

The size adjustment unit 14 acquires the final output image SGA by superimposing the resized image RGA on the central part of the background image BGA (see FIG. 4). In other words, the size adjustment unit 14 performs the padding processing that matches the size of the resized image RGA with the size of the final output image SGA using the background image BGA. According to the example illustrated in FIG. 4, the size adjustment unit 14 performs the padding processing such that the margin parts existing on the left and right sides of the resized image RGA are filled with the background image BGA. Further, according to the present example embodiment, the size adjustment unit 14 may perform the padding processing such that a margin part existing in the vertical direction of the resized image RGA is filled with the background image BGA on the basis of the size of the final output image SGA and the size of the resized image RGA.

The size adjustment unit 14 outputs the final output image SGA obtained by applying the aforementioned padding processing on the resized image RGA to the outside of the image processing device 100.

According to the present example embodiment, when the size of the synthesized image outputted from the brightness correction unit 12 is larger than the size of the final output image, the super resolution processing unit 13 may directly output the synthesized image to the size adjustment unit 14. In such a case, it is sufficient that the size adjustment unit 14 applies the resize processing and the padding processing on the synthesized image outputted from the super resolution processing unit 13, instead of the enlarged image.

According to the above-described processing, it is possible to acquire, as the final output image SGA, an image in which the two-dimensional shape and the surface pattern of the lesion candidate LC included in the endoscopic image NGA are maintained. Further, according to the above-described processing, it is possible to acquire, as the final output image SGA, an image that includes the lesion candidate LC having a higher image quality than the image quality in the endoscopic image NGA.

As described above, the size adjustment unit 14 can perform the resize processing of resizing the size of the lesion candidate image according to the target size while maintaining the aspect ratio of the lesion candidate image. Further, as described above, the size adjustment unit 14 can perform the padding processing of matching the size of the resized image obtained by the resize processing to the target size. In addition, as described above, the size adjustment unit 14 can apply the resize processing on the lesion candidate image whose brightness is corrected. Further, as described above, as the resize processing, the size adjustment unit 14 can perform the reduction processing of reducing the size of the lesion candidate image after the super resolution processing, to the maximum size that fits in the target size. Further, as described above, as the padding processing, the size adjustment unit 14 can perform the processing of superimposing the resized image obtained by the reduction processing on the central portion of the background image having the same size as the target size. In addition, as described above, the size adjustment unit 14 can generate a monochrome image in which the entire area is colored in a color represented by the intermediate values of the color component values of the pixels included in the lesion candidate image after the super resolution processing, and can acquire an image in which noise is added to the monochrome image as a background image.

[Processing Flow]

Figure 5:
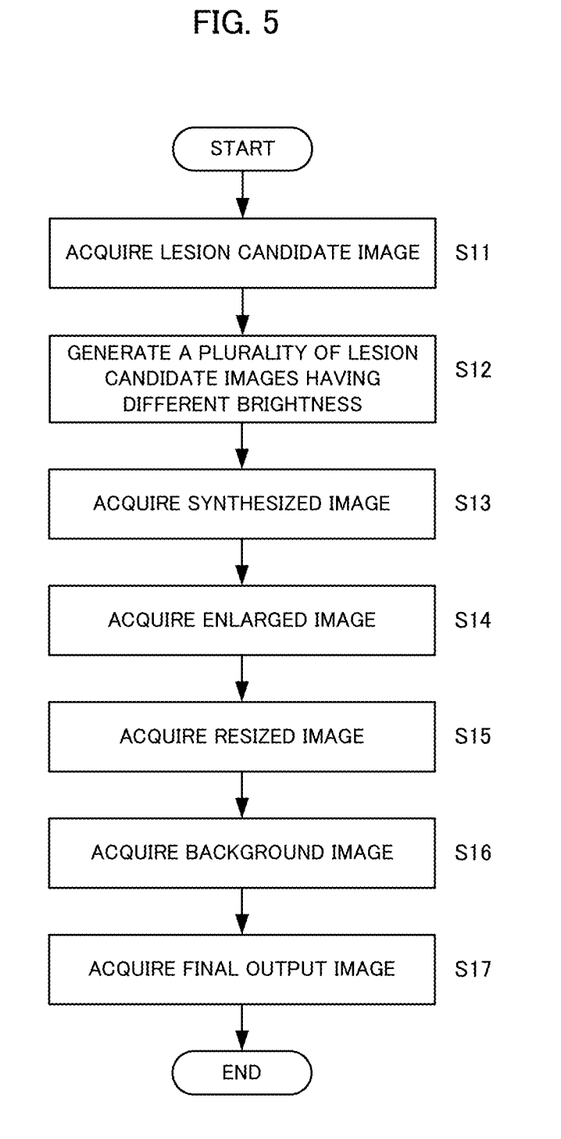
FIG. 5 is a flowchart illustrating an example of the processing performed by the image processing device according to the first example embodiment.

Subsequently, a flow of processing performed in the image processing device according to the first example embodiment will be described. FIG. 5 is a flowchart illustrating an example of processing that is performed in the image processing device according to the first example embodiment.

First, the image processing device 100 detects the lesion candidate included in the endoscopic image and acquires the lesion candidate image including the detected lesion candidate (step S11).

Next, the image processing device 100 generates a plurality of lesion candidate images having a brightness different from each other based on the brightness of the lesion candidate image obtained in step S11 (step S12).

Subsequently, the image processing device 100 acquires a synthesized image by synthesizing the plurality of lesion candidate images obtained in step S12 using the technique according to HDR synthesis (step S13).

Subsequently, the image processing device 100 acquires an enlarged image by performing a super resolution processing for enlarging the synthesized image obtained in step S13 to a size larger than the size of the final output image (step S14).

Subsequently, the image processing device 100 acquires a resized image by performing the resize processing of reducing the size of the enlarged image according to the size of the final output image while maintaining the aspect ratio of the enlarged image obtained in step S14 (step S15).

Subsequently, the image processing device 100 acquires the background image by adding the monochromatic image generated on the basis of the color component values of the respective pixels of the enlarged image obtained in step S14 and the noise image representing the irregular noise within a predetermined amplitude (step S16). The monochromatic image, the noise image, and the background image described above have the same size as the size of the final output image. In addition, the entire area of the monochrome image described above is colored with the color corresponding to the intermediate values of the color component values of the pixels in the enlarged image obtained in step S14.

Subsequently, the image processing device 100 acquires the final output image by superimposing the resized image obtained in step S15 on the central part of the background image obtained in step S16 (step S17).

As described above, according to the present example embodiment, it is possible to acquire, as the final output image, an image capable of grasping the details of the lesion candidate while maintaining the elements such as the two-dimensional shape and the surface pattern representing the characteristic of the lesion candidate included in the endoscopic image. Therefore, according to the present example embodiment, it is possible to improve the diagnostic accuracy of the lesion candidates included in the endoscopic image.

As described above, according to the present example embodiment, by applying the super resolution processing and the resize processing on the lesion candidate image including the lesion candidate detected from the endoscopic image, it is possible to obtain the resized image in which the elements such as the two-dimensional shape and the surface pattern representing the characteristic of the lesion candidate are maintained. Further, as described above, according to the present example embodiment, it is possible to perform the padding processing of matching the size of the resized image to the size of the final output image, using the background image having a color similar to the color of the resized image but having no characteristic as a lesion candidate. Therefore, according to this example embodiment, it is possible to suitably learn the machine learning model for diagnosis of a lesion candidate by using the final output image obtained through the aforementioned padding processing as the learning data, for example.

Second Example Embodiment

Figure 6:
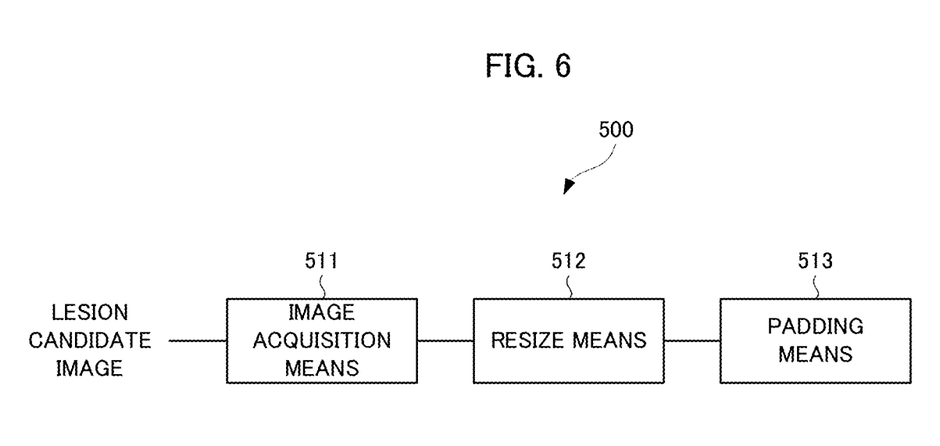
FIG. 6 is a block diagram showing a functional configuration of an image processing device according to a second example embodiment.

FIG. 6 is a block diagram illustrating a functional configuration of an image processing device according to a second example embodiment.

The image processing device 500 according to this example embodiment has the same hardware configuration as that of the image processing device 100. The image processing device 500 includes an image acquisition means 511, a resize means 512, and a padding means 513.

Figure 7:
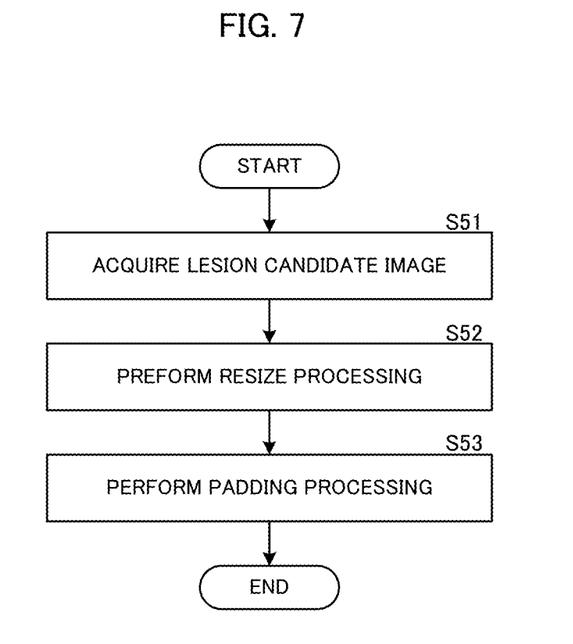
FIG. 7 is a flowchart for explaining processing performed in the image processing device according to the second example embodiment.

FIG. 7 is a flowchart for explaining processing performed in the image processing device according to the second example embodiment.

The image acquisition means 511 acquires a lesion candidate image including a lesion candidate detected from an endoscopic image (step S51).

The resize means 512 performs a resize processing for resizing a size of the lesion candidate image according to a target size while maintaining an aspect ratio of the lesion candidate image (step S52).

The padding means 513 performs padding processing for matching a size of a resized image obtained by the resize processing to the target size (step S53).

According to the present example embodiment, it is possible to improve the diagnostic accuracy of the lesion candidates included in the endoscopic image.

A part or all of the example embodiments described above may also be described as the following supplementary notes, but not limited thereto.

(Supplementary Note 1)

An image processing device comprising:
an image acquisition means configured to acquire a lesion candidate image including a lesion candidate detected from an endoscopic image;
a resize means configured to perform resize processing for resizing a size of the lesion candidate image according to a target size while maintaining an aspect ratio of the lesion candidate image; and
a padding means configured to perform padding processing for matching a size of a resized image obtained by the resize processing to the target size.

(Supplementary Note 2)

The image processing device according to Supplementary note 1, further comprising a brightness correction means configured to correct brightness of the lesion candidate image,
wherein the resize means performs the resize processing for the lesion candidate image whose brightness is corrected.

(Supplementary Note 3)

The image processing device according to Supplementary note 2, further comprising a super resolution processing means configured to perform super resolution processing for enlarging the size of the lesion candidate image whose brightness is corrected to a size larger than the target size,
wherein the resizing means performs, as the resize processing, reduction processing of reducing the size of the lesion candidate image after the super resolution processing to a maximum size that fits in the target size.

(Supplementary Note 4)

The image processing device according to Supplementary note 3, wherein the padding means performs, as the padding processing, processing of superimposing the resized image obtained by the reduction processing on a central portion of a background image having the same size as the target size.

(Supplementary Note 5)

The image processing device according to Supplementary note 4, wherein the padding means generates a monochrome image in which an entire area is colored in a color represented by intermediate values of color component values of pixels included in the lesion candidate image after the super resolution processing, and acquires an image in which noise is added to the monochrome image as the background image.

(Supplementary Note 6)

An image processing method comprising:
acquiring a lesion candidate image including a lesion candidate detected from an endoscopic image;
performing resize processing for resizing a size of the lesion candidate image according to a target size while maintaining an aspect ratio of the lesion candidate image; and
performing padding processing for matching a size of a resized image obtained by the resize processing to the target size.

(Supplementary Note 7)

A recording medium storing a program, the program causing a computer to execute:
acquiring a lesion candidate image including a lesion candidate detected from an endoscopic image;
performing resize processing for resizing a size of the lesion candidate image according to a target size while maintaining an aspect ratio of the lesion candidate image; and
performing padding processing for matching a size of a resized image obtained by the resize processing to the target size.

While the present disclosure has been described with reference to the example embodiments, the present disclosure is not limited to the above example embodiments and examples. Various changes which can be understood by those skilled in the art within the scope of the present disclosure can be made in the configuration and details of the present disclosure.

DESCRIPTION OF SYMBOLS

11 Lesion candidate detection unit
12 Brightness correction unit
13 Super resolution processing unit
14 Size adjustment unit
100 Image processing device

What is claimed is:
1. An image processing device comprising:
a memory configured to store instructions; and
a processor configured to execute the instructions to:
acquire a lesion candidate image including a lesion candidate detected from an endoscopic image;

correct brightness of the lesion candidate image;

perform super resolution processing for enlarging the size of the lesion candidate image whose brightness is corrected to a size larger than a target size;

perform resize processing for resizing a size of the lesion candidate image according to the target size while maintaining an aspect ratio of the lesion candidate image, the resize processing including reduction processing of reducing the size of the lesion candidate image after the super resolution processing to a maximum size that fits in the target size; and perform padding processing for matching a size of a resized image obtained by the resize processing to the target size.

2. The image processing device according to claim 1, wherein the processor performs, as the padding processing, processing of superimposing the resized image obtained by the reduction processing on a central portion of a background image having the same size as the target size.

3. The image processing device according to claim 2, wherein the processor generates a monochrome image in which an entire area is colored in a color represented by intermediate values of color component values of pixels included in the lesion candidate image after the super resolution processing, and acquires an image in which noise is added to the monochrome image as the background image.

4. The image processing device according to claim 1, wherein a final output image obtained by the padding processing is an image optimized as learning data for learning a machine learning model for diagnosis of cancer candidates.

5. An image processing method comprising:

acquiring a lesion candidate image including a lesion candidate detected from an endoscopic image;

correcting brightness of the lesion candidate image;

performing super resolution processing for enlarging the size of the lesion candidate image whose brightness is corrected to a size larger than a target size;

performing resize processing for resizing a size of the lesion candidate image according to the target size while maintaining an aspect ratio of the lesion candidate image, the resize processing including reduction processing of reducing the size of the lesion candidate image after the super resolution processing to a maximum size that fits in the target size; and performing padding processing for matching a size of a resized image obtained by the resize processing to the target size.

6. A non-transitory computer-readable recording medium storing a program, the program causing a computer to execute:

acquiring a lesion candidate image including a lesion candidate detected from an endoscopic image;

correcting brightness of the lesion candidate image;

performing super resolution processing for enlarging the size of the lesion candidate image whose brightness is corrected to a size larger than a target size;

performing resize processing for resizing a size of the lesion candidate image according to the target size while maintaining an aspect ratio of the lesion candidate image, the resize processing including reduction processing of reducing the size of the lesion candidate image after the super resolution processing to a maximum size that fits in the target size; and performing padding processing for matching a size of a resized image obtained by the resize processing to the target size.

\* \* \* \* \*